Oct. 26, 1926.
J. A. WEIGEL
CASTER
Filed Jan. 2, 1925
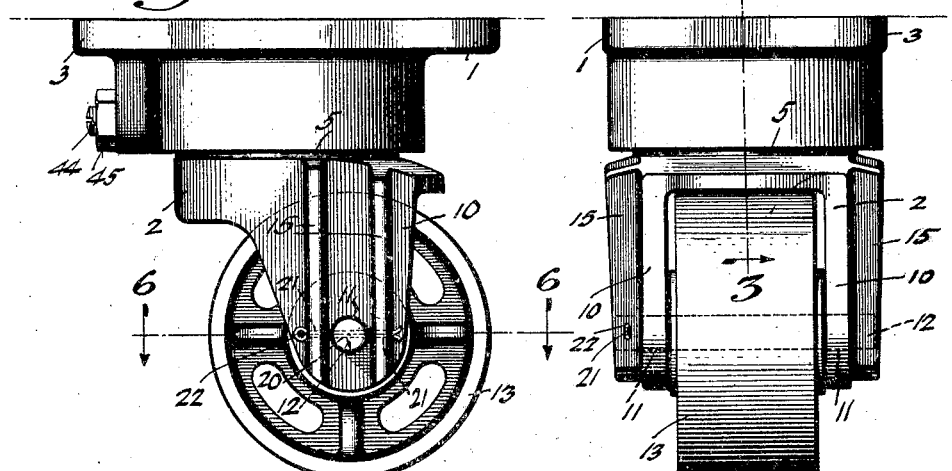
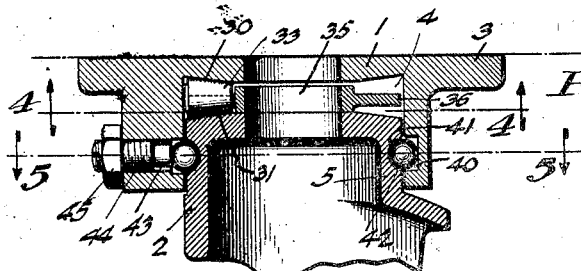
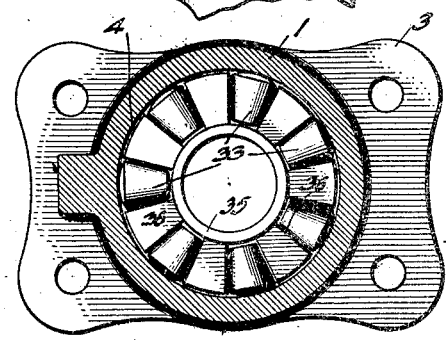
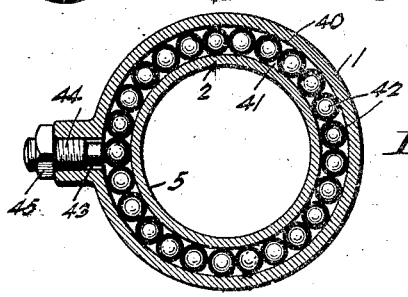
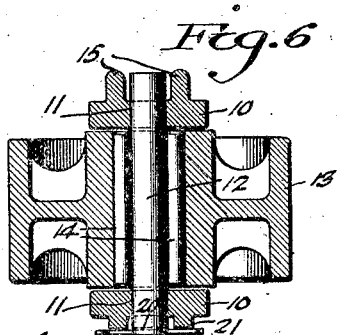
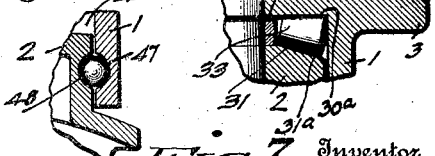
Inventor
John A. Weigel
By Wood & Wood
Attorneys Patented Oct. 26, 1926.

1,604,729

UNITED STATES PATENT OFFICE.

JOHN A. WEIGEL, OF HAMILTON, OHIO.

CASTER.

Application filed January 2, 1925. Serial No. 1.

This invention relates to improvements in casters of the swiveled wheel type.

One object of the invention is to provide an anti-friction bearing caster in which certain of the anti-friction elements act to lock the parts together in swiveled relation.

Another object is to provide two sets of anti-friction devices each of different type, respectively for sustaining vertical and lateral thrusts.

Another object is to provide a very durable type of anti-friction device for the caster, adapted to receive vertical thrusts, in which the friction between the elements on the bearing surfaces is reduced to a minimum.

Another object is to provide a caster in which vertical movement of the assembled parts is provided for to compensate for wear of the vertical thrust receiving anti-friction elements.

Another object is to provide improved fastening means for holding the roller shaft against rotation in its bearings.

Another object of the invention is to provide a device which may be cheaply manufactured and which can be easily assembled.

Other objects, advantages and certain features of the invention will be disclosed in the drawings forming part of this application and in said drawings:

Figure 1 is a side elevation of my improved caster.

Figure 2 is an end view taken at right angles to Figure 1.

Figure 3 is a vertical section on line 3—3 of Figure 2, showing the assembled details.

Figure 4 is a section on line 4—4 of Figure 3, showing the arrangement of the conical roller bearings.

Figure 5 is a similar view on line 5—5 of Figure 3, showing the relation of the ball bearings.

Figure 6 is a section through the roller on line 6—6 of Figure 1, illustrating the manner of locking the roller shaft against rotation.

Figure 7 shows a modification of the roller bearing assembled using oppositely related semi-circular grooves.

Figure 8 shows a modified form of roller bearing in which only one of the bearing seats is conical.

The details of construction of the preferred embodiment of my invention are best shown in Figure 3 which represents a form of caster particularly adapted for heavy duty.

The caster comprises an upper cup element 1 as an attachment member, and a lower wheel frame 2. The cup element as a housing member is of hollow cylindrical configuration, is closed at the upper end and has marginal outwardly extending attaching flanges 3 with openings through which fastening devices are interposed to secure the housing. A recess 4 is thus provided within which the upward cylindrical body portion 5 of the wheel frame 2 loosely engages for swiveling the lower member to the upper. The body of this wheel frame has extending downwardly therefrom spaced legs 10 at the lower end of which are aligned openings or bores 11 traversed by a shaft 12 upon which is disposed the wheel 13. Roller bearings 14 surround the shaft within the hub bore of the wheel and longitudinal translation of the same is prevented by the side walls of the legs, see Figure 6.

It is desirable to non-rotatably secure the shaft 12 against displacement, and novel means is herein provided for this purpose as follows:

The outer faces of the legs 10 are provided with longitudinally extending parallel spaced ribs 15 acting both as strengthening ribs and as means for securing the shaft against rotation. The ends of the shaft extend beyond the legs and between the parallel ribs, see Figure 6, and one end of the shaft has a bore 20, preferably diametric, adapted to register or align with correspondingly aligned cross bores 21, one in each rib. All bores are alignable and when aligned a split key or cotter pin 22 is passed therethrough and the projecting ends of the pin bent as shown to prevent accidental removal. The shaft is thus positively locked against displacement or rotation.

It will be noted, however, that one rib may be used, with the pin 22 passing through a single opening therein and then through the diametric opening of the shaft, or a lug may be used in a similar manner, the pin passing through the lug and then through the diametric opening in the shaft.

Vertical or longitudinal thrusts are sustained and the wear of anti-friction devices is reduced to a minimum in the following novel manner:

The end wall of the cavity is machined as at 30, see Figure 3, to provide a downwardly convergent conical roller bearing set which is opposingly related to a similar seat 31 on the end face of the cylindrical body portion 5 of the wheel frame.

Arranged between the opposing conical bearing surfaces thus formed, and against the same is an annular series of radially disposed substantially cone-shaped thrust receiving rollers 33 and said rollers are held in spaced relation by a circular spacer element 35 having radial inwardly convergent substantially V-shaped projections 36, each adapted to lie between two adjacent rollers with opposing edges of adjacent projections substantially parallel with the surface of the rollers providing inwardly convergent openings into which the rollers loosely fit, the arms acting as separators. The rollers are thus inwardly convergently disposed.

By the use of conical rollers, the wear of said rollers and bearing surfaces is reduced, inasmuch as the opposingly related surfaces or seats conform to that of the bearing rollers at all points, so that there is no tendency for any portion of the roller to travel at greater or less speed than another.

The housing and wheel frame are secured together in assembled relation and adapted for rotation by the following device:

The recess 5 has a circumferential groove 40 of rectangular cross section adapted for opposing registration with a companion groove 41 of semi-circular cross section to form a ball race. After the introduction of the wheel frame within the recess of the housing, balls 42 are introduced into the channel through a radial bore 43 which is afterwards closed by a screw plug 44, the plug being locked against rotation by a nut 45.

The radius of this semi-circular groove is slightly greater than that of the ball and the longitudinal vertical dimension of the square groove is relatively considerably greater than the diameter of the ball. Thus the housing is free to move downwardly to compensate for wear, the balls at all times engaging the side or vertical wall of the rectangular groove to uninterruptedly sustain the lateral thrusts.

Considerable wear take up for the roller bearing is necessary and this clearance for vertical play is provided between the housing and wheel frame, the circumferential rectangular groove in the housing being elongated vertically or in a direction parallel with the rotative axis of the wheel frame. Thus, as wear progresses between the rollers and their conical bearing seats, the housing is permitted to ride toward the wheel frame while at the same time proper lateral thrust bearing contact is maintained.

In Figure 7, I have illustrated a modification in which two semi-circular grooves 47, 48 respectively, in the housing and wheel frame are used, the radius of the grooves being slightly greater than that of the balls, thus allowing slight axial play to compensate for wear in the roller bearing. In Figure 8, I show a modification in which a flat bearing surface 30$^a$ is provided in lieu of the conical surface 30 for the reason that a flat surface is more easily finished. To compensate, the angle of the conical seat 31$^a$ is increased and the axes of the rollers are tilted from the horizontal and no longer lie at a right angle to the rotative axis of the caster.

Inasmuch as the tendency of the conical rollers is to ride outwardly into contact with the vertical wall of the recess as the wheel frame rotates, each roller bearing has an outer substantially spherical convex face for reducing friction, these spherical faces having virtually a point contact.

The radius of curvature of the annular series of balls is preferably slightly greater than that of the annular series of cone rollers. The rollers are designed to sustain the greater part of the weight and the balls to receive side thrusts, the opposingly related grooves and balls therein also acting to secure the frame and housing together in swiveled relation.

Having described my invention, what I claim is:

1. A caster comprising a housing, a wheel frame projecting loosely and rotatably within the housing, opposingly related grooves in housing and wheel frame, respectively a rectangular groove elongated in axial direction and a circular groove of less diameter than the lengthwise dimension of the rectangular groove, an annular series of balls within the groove as thrust receiving elements acting to hold the housing and frame in assembled relation, and cone-shaped rollers radially arranged between the housing and wheel frame for receiving vertical thrusts.

2. In a caster, a housing having a cavity therein, said cavity having a rectangular circumferential ball groove elongated axially of the housing and disposed at a right angle to its axis, and having a radial passage leading into the groove, a wheel frame having a cylindrical projection loosely engaged in the cavity, and having a circular groove of less diameter than the long dimension of the rectangular groove adapted for registration with said rectangular groove, a series of balls as lateral thrust bearings disposed within the grooves for holding the housing and frame in assembled or swiveled relation, spaced substantially conical radially disposed rollers disposed between opposing walls of the cavity, and frame projection, and a circular spacer member having radial arms extending loosely between the rollers.

3. A caster comprising, an attaching housing having a cylindrical recess therein, a wheel frame having a cylindrical portion extending loosely into the recess, an annular series of balls interposed between the walls of the housing recess and the cylindrical portion for providing a lateral thrust bearing therebetween, said bearings snugly seated within one element and vertically movable on the other to prevent any binding due to end thrusts on said bearings and roller bearings radially arranged between the horizontal end faces of the frame cylindrical portion and housing recess for receiving end thrusts.

In witness whereof, I hereunto subscribe my name.

JOHN A. WEIGEL.